UNITED STATES PATENT OFFICE.

GUSTAVUS ARND, OF NEW YORK, N. Y.

IMPROVEMENT IN LINING BARRELS, &c.

Specification forming part of Letters Patent No. 43,172, dated June 21, 1864.

*To all whom it may concern:*

Be it known that I, GUSTAVUS ARND, of the city, county, and State of New York, have invented a new and Improved Process for Lining Barrels; and I do hereby declare that the following is a full, clear, and exact description of the same.

The object of this invention is particularly to render coal-oil or petroleum barrels perfectly oil and water tight. The staves when left unprotected are capable to prevent the escape of water; but the petroleum passes through the pores of the wood, and a great loss is the result. In order to prevent this loss, the staves must be protected by a lining which is impervious and insoluble in the oil, and at the same time impervious and insoluble in water, a larger or smaller quantity of which always finds its way into the barrels with the oil. A lining of this description is obtained by my process, which consists in spreading on the inner end face of the barrel a solution of india-rubber, gutta-percha, or allied gum in alcohol, naphtha, benzine, sulphate of carbon, or any other suitable liquid mixed with such materials which increase its volume and are capable of vulcanizing the rubber or gum at the proper degree of heat, and after this solution has been spread on the entire inner surface of the barrel the curing or vulcanizing process is effected by the introduction of hot air or steam.

To enable those skilled in the art to make and use my invention, I will proceed to describe it.

For the solution I use raw india-rubber, gutta-percha, or allied gums, and the operation of dissolving the gums may be facilitated by raising the temperature of the liquid according to circumstances. This solution is mixed with carbonates or sulphates, or with ground vulcanized rubber or other gum, or with such mixtures or compositions as are generally used for airing or vulcanizing said rubber or gums, and the mixture thus obtained is spread on the inner surface of the barrel by pouring a quantity of the same in the barrel and moving the same until its entire inner surface is well covered. After the surplus is drained off, steam or hot air is introduced into the barrel, and the temperature is raised to such a degree that the vulcanizing process of the gums in the solution is effected. When this effect has been accomplished, the lining of the barrel is perfectly insoluble in the liquids with which it may be brought in contact, and it forms a perfect safeguard against any loss of leakage.

It is obvious that this lining may be applied to vessels of any other description whenever it may be desirable and applicable.

What I claim as my invention, and desire to secure by Letters Patent, is—

1. A lining for barrels, &c., produced by spreading on its inner surface a solution of india-rubber or allied gums and curing the same by the introduction of steam or hot air, substantially as and for the purpose specified.

2. The within-described process of producing a lining for barrels, &c., by vulcanizing or mixing a solution of india-rubber or allied gums after the same has been spread on the surface to be protected.

GUSTAVUS ARND.

Witnesses:
 D. ROBERTSON,
 THOS. S. J. DOUGLAS.